United States Patent
Duarte et al.

(10) Patent No.: US 8,797,267 B2
(45) Date of Patent: Aug. 5, 2014

(54) VIRTUAL HARD KEYS ON A WIRELESS DEVICE

(75) Inventors: Matias Duarte, Los Angeles, CA (US); Peter J. Ford, Los Angeles, CA (US); Gregory Paul Hayes, Santa Monica, CA (US)

(73) Assignee: Virgin Mobile USA, L.P., Warren, NJ (US)

( * ) Notice: Subject to any disclaimer, the term of this patent is extended or adjusted under 35 U.S.C. 154(b) by 1362 days.

(21) Appl. No.: 11/519,268

(22) Filed: Sep. 12, 2006

(65) Prior Publication Data

US 2008/0062134 A1    Mar. 13, 2008

(51) Int. Cl.
*G06F 3/02*    (2006.01)

(52) U.S. Cl.
USPC ........................................................ 345/169

(58) Field of Classification Search
CPC ... G06F 1/1624; G06F 1/1671; G06F 1/1684; G06F 2200/1614; G06F 3/0238; G06F 3/04886; H04M 1/7258; H04M 2250/12
USPC ........ 345/156, 158, 169, 649, 173; 340/573.1
See application file for complete search history.

(56) References Cited

U.S. PATENT DOCUMENTS

| | | | |
|---|---|---|---|
| 5,825,675 A | 10/1998 | Want et al. | |
| 6,463,304 B2 | 10/2002 | Smethers | |
| 6,538,636 B1 | 3/2003 | Harrison | |
| 6,593,914 B1 * | 7/2003 | Nuovo et al. | 345/169 |
| 7,085,590 B2 | 8/2006 | Kennedy et al. | |
| 7,181,251 B2 | 2/2007 | Stohr | |
| 7,289,102 B2 * | 10/2007 | Hinckley et al. | 345/156 |
| 7,353,069 B2 | 4/2008 | Tsai | |
| 7,742,783 B2 * | 6/2010 | Duarte | 455/550.1 |
| 2002/0033836 A1 | 3/2002 | Smith | |
| 2004/0201595 A1 | 10/2004 | Manchester | |
| 2005/0044510 A1 | 2/2005 | Yi | |
| 2005/0068292 A1 * | 3/2005 | Duarte et al. | 345/156 |
| 2005/0068337 A1 | 3/2005 | Duarte et al. | |
| 2005/0090288 A1 | 4/2005 | Stohr et al. | |
| 2006/0176278 A1 * | 8/2006 | Mathews et al. | 345/168 |
| 2006/0215011 A1 | 9/2006 | P. S. et al. | |
| 2007/0004451 A1 * | 1/2007 | Anderson | 455/556.1 |
| 2007/0035524 A1 * | 2/2007 | Hyatt | 345/173 |
| 2007/0042707 A1 * | 2/2007 | Better et al. | 455/3.02 |
| 2007/0111750 A1 * | 5/2007 | Stohr et al. | 455/550.1 |
| 2007/0171239 A1 * | 7/2007 | Hunt et al. | 345/649 |
| 2007/0178891 A1 * | 8/2007 | Louch et al. | 455/420 |
| 2008/0214250 A1 | 9/2008 | Chauhan et al. | |

OTHER PUBLICATIONS

International Search Report from the International Searching Authority for International Application No. PCT/US2007/019264, mailed Apr. 14, 2008, 6 pages.
Written Opinion of the International Searching Authority for International Application No. PCT/US2007/019264, mailed Apr. 14, 2008, 8 pages.
United States Office Action, U.S. Appl. No. 11/801,710, Feb. 22, 2010. 7 pages.
United States Office Action, U.S. Appl. No. 11/801,710, mailed Nov. 18, 2009, 11 pages.

* cited by examiner

*Primary Examiner* — Quan-Zhen Wang
*Assistant Examiner* — Tony Davis

(57) ABSTRACT

Embodiments of the claimed invention provide systems and methods whereby the functionality of soft keys on a mobile electronic device may be shifted depending on the orientation of the device. The device detects its orientation and then maps a different function to the appropriate soft keys to ensure that the soft keys retain their functionalities from the end-user's perspective.

22 Claims, 2 Drawing Sheets

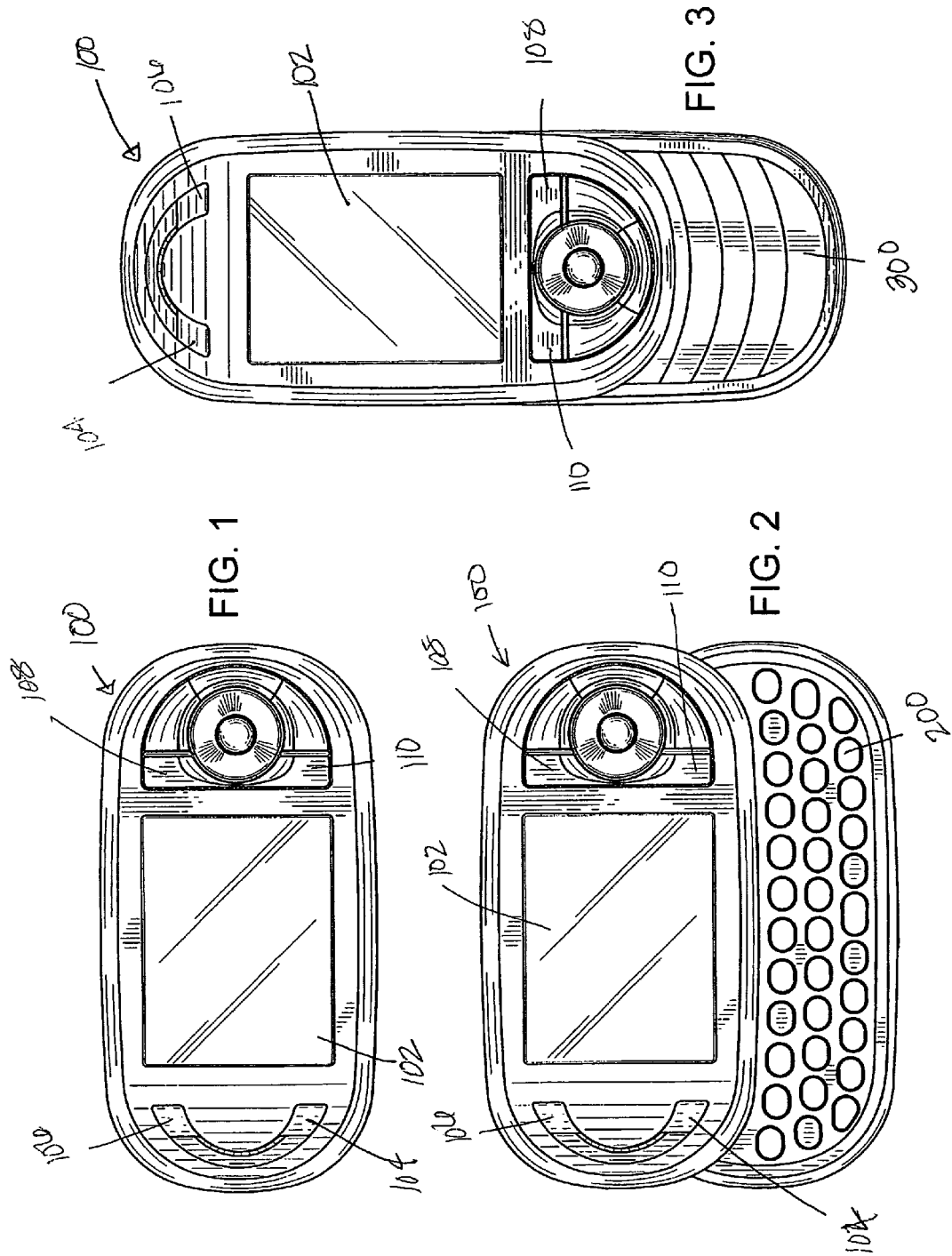

VIRTUAL HARD KEYS ON A WIRELESS DEVICE

FIELD OF THE INVENTION

This invention relates to mobile electronic devices and specifically to the keys on a mobile electronic device.

BACKGROUND OF THE INVENTION

Presently, mobile electronic devices are multi-function devices. Certain devices allow the end-user to access different device functionalities based on the orientation of the device. For example, a cell phone end-user may use his cell phone as a phone in one orientation and as a keyboard for writing text messages in another orientation. In some devices, a rotation of the device ninety degrees results in different functionality. In other devices, opening and closing the device may result in different functionalities.

However, when the device is rotated, keys adjacent to the device's screen move relative to the end-user. In an initial orientation the "send" key could be in the bottom left corner of the screen. Upon rotation the "send" key moves to the bottom right corner of the screen. The movement of keys and their functionalities relative to the end-user can confuse end-users.

To eliminate confusion, some mobile electronic devices are equipped with soft keys, i.e. keys that can change functionality. These electronic devices typically shift the functionality of their soft keys based on the physical configuration of the device, and in particular, upon physical switches, which are activated when each device is open or closed.

SUMMARY OF THE INVENTION

Nevertheless, a need exists for systems and methods for varying the function of a mobile electronic device's soft keys based upon its orientation.

In satisfaction of this need and others, the present invention relates to a mobile electronic device containing virtual hard keys wherein the functionality of the virtual hard keys change based on the orientation of the device.

In one aspect, the present teachings relate to a mobile electronic device that includes a sensor for detecting an orientation of the device, a first soft key that can adopt one or more functions depending upon the orientation of the device, and a screen that changes its display based on the orientation of the device. In some embodiments the sensor is a gravimetric sensor, such as a mercury switch, a pendulum, or a ball bearing switch. In other embodiments, the sensor is a gyroscope. Additionally, the device may further include a second soft key that can adopt one or more functions depending upon the orientation of the device. For example, in one orientation of the device, the first soft key provides a specific functionality and in another orientation of the device, the second soft key provides the same specific functionality. Thus, the first and second soft keys exchange functionality such that the desired functionality is always provided by a soft key which is fixed with respect to an end-user.

A second aspect of the present teachings also relates to a mobile electronic device, which includes a means for detecting an orientation of the device, a means for changing a function of a device key based on the orientation of the device, and a means for altering a display based on the orientation of the device.

Another aspect of the present teachings relates to a method for changing a function of a soft key on a device including the steps of detecting a first orientation of the device at a first time, sensing a change in the orientation of the device to a second orientation, and mapping a different function to the soft key. The method may further include the steps of polling the sensors in the device to determine the device's orientation after the first orientation is detected and sending an interrupt to a processor within the device immediately after a change in the orientation of the device is detected. The method may further include mapping one or more functions depending upon the orientation of the device to a second soft key. Accordingly, in a first orientation, the first soft key provides a specific functionality, and in a second orientation, the second soft key provides the same specific functionality. Thus, the first and second soft keys exchange functionality such that the desired functionality is always provided by a soft key which is fixed with respect to an end-user. The sensor is a gravimetric sensor, such as a mercury switch, a pendulum, or a ball bearing switch. The sensor may also be a gyroscope.

In another embodiment, a method for changing a function of a key on a device includes the steps of detecting a first orientation of the device at a first time and configuring the function of the key with respect to the orientation. The method may further include detecting a second orientation of the device at a second time, and if there is a difference between the first and second orientations, reconfiguring the function of the key with respect to the new orientation. The configuring and reconfiguring the function of the key may comprise shifting the function of one key to another key such that the location of the key with a specific function remains fixed relative to the end-user.

BRIEF DESCRIPTION OF THE DRAWINGS

These embodiments and other aspects of this invention will be readily apparent from the detailed description below and the appended drawings, which are meant to illustrate and not to limit the invention, and in which:

FIG. 1 is a schematic depiction of a mobile electronic device in a first orientation, according to an embodiment of the present invention.

FIG. 2 is a schematic depiction of a mobile electronic device in the first orientation with a first key pad exposed.

FIG. 3 is a schematic depiction of a mobile electronic device in a second orientation with a second key pad exposed.

DETAILED DESCRIPTION OF THE PREFERRED EMBODIMENTS

Figure 4:
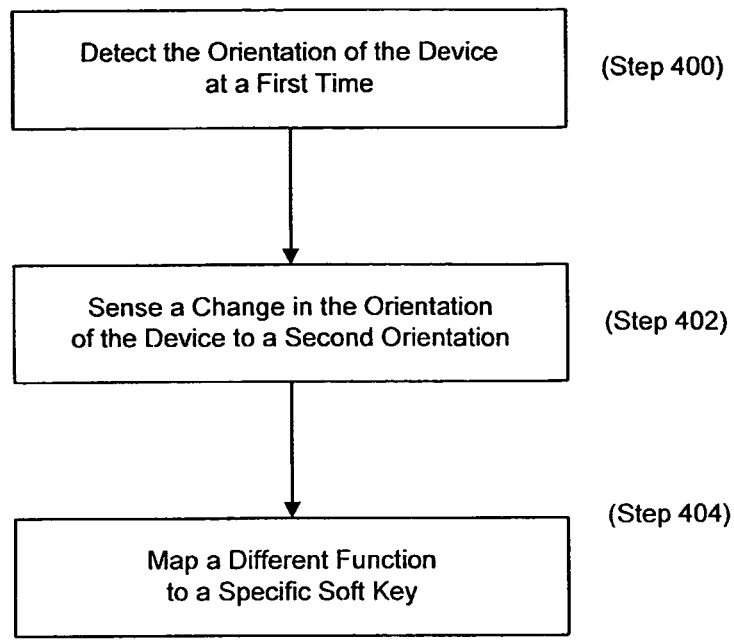
FIG. 4 is a high level flow chart depicting exemplary steps involved in the implementation of virtual hard keys according to an embodiment of the present invention.

The present invention will be more completely understood through the following detailed description, which should be read in conjunction with the attached drawings. In this description, like numbers refer to similar elements within various embodiments of the present invention. Within this detailed description, the claimed invention will be explained with respect to preferred embodiments. However, the skilled artisan will readily appreciate that the methods and systems described herein are merely exemplary and that variations can be made without departing from the spirit and scope of the invention.

In general, embodiments of the claimed invention provide systems and methods whereby the functionality of soft keys on a mobile electronic device may be shifted depending on the orientation of the device. The device detects its orientation and then maps different functions to the appropriate soft keys to ensure that the soft keys retain their functionalities from the end-user's perspective.

FIG. 1 is a schematic depiction of a mobile electronic device in a first orientation, according to an embodiment of the present invention. As illustrated, the mobile electronic device, or phone 100, includes a screen 102, a first key 104, a second key 106, a third key 108, a fourth key 110, a memory (not shown), a processor (not shown), and one or more sensors (not shown). The first key 104, second key 106, third key 108, and the fourth key 110 may all be soft keys. A soft key is a key that can perform different functions based upon the operation of the phone 100. Soft keys may include any input surface whose resultant function may be interpreted by the device's software. For example, soft keys may include touch screen keys, or even keys that are normally thought to have a fixed function such as "left direction" (which would become "down direction" when the device is rotated counterclockwise). The screen 102 may be a LCD screen or any other type of screen known to one of skill in the art. In this first, or horizontal, orientation, the screen 102 would preferably display in landscape mode.

The sensors may be any type of sensor that has the ability to determine the orientation of a device. Depending on the type of sensor used, one or more sensors may be required for each orientation of the phone 100 or a single sensor may have the ability to detect multiple orientations. In various embodiments, one, two, three, four, or more sensors are used. One or two sensors may be used for a two-orientation phone 100. For example, two possible orientations for the phone 100 may include landscape and portrait orientations. In other embodiments, one or more sensors, for example two, are used. One, two, three or four sensors may be used when the phone 100 is operated in three, four, or more orientations. For example, if the phone 100 is operated throughout a 360 degree rotation, multiple sensors may be required to detect the specific orientation of the phone 100.

The sensor may be, for example, a gravimetric sensor. Gravimetric sensors use the force or pull of gravity to determine the orientation of objects with respect to the Earth's surface. Exemplary gravimetric sensors include mercury switches, pendulums, and ball bearing switches.

A mercury switch uses gravity and electrical conductivity to determine orientation. A mercury switch permits or interrupts the flow of electrical current through an electrical circuit in a manner dependent upon the switch's orientation with respect to Earth's gravity. The switch itself may comprise one or more electrical contacts and a bead of mercury sealed in a container. Since gravity is always pulling the mercury to the point in the container closest to the Earth's surface, when the container is tilted in the appropriate direction, the mercury touches a set of contacts. The contact between the mercury and the electrical contacts completes the circuit. Tilting the container in another direction may break the circuit. When the circuit is complete, the switch can determine the orientation of the device in which the switch is implanted. Thus, the phone 100 may have one mercury switch to detect one orientation and second mercury switch to detect another orientation. A plurality of mercury switches may be added to determine any number of orientations of the phone 100.

A pendulum sensor also uses gravity to detect orientation. A pendulum sensor may comprise a piece of dense material, such as metal, on a pendulum and a switch. When the device is in a certain orientation, the metal attached to the pendulum falls perpendicular to the Earth's surface, under the force of gravity, and directly contacts the switch. The contact with the switch registers that orientation with the processor of the phone 100. The pendulum is sized such that the metal attached to the pendulum contacts the switch only in one orientation. Thus, to detect multiple orientations, multiple pendulum sensors may be required. In the illustrated phone, a pendulum may be very small, even microscopic.

A ball bearing switch also uses gravity to sense orientation. In one embodiment, a ball bearing is encased in a sleeve in which it can freely roll back and forth in a line. When the phone 100, in which the switch is located, is oriented in a certain direction the ball bearing will roll to one end of the sleeve, engaging a contact at that end of the sleeve. Thus, the ball bearing switch may detect this orientation. The ball bearing switch may also detect the inverse orientation, i.e. when the ball bearing rolls to the other end of the sleeve.

In another embodiment the sensor is a gyroscope. A gyroscope is a device for detecting orientation based on angular momentum. A gyroscope can detect changes in orientation in all three hundred and sixty degrees of rotation. Thus, only one gyroscope would be needed to detect multiple orientations of the phone 100.

FIG. 2 is a schematic depiction of a mobile electronic device in a first orientation with a first key pad exposed. In this orientation, the height of the phone 100 exceeds the phone's 100 length. In this embodiment a first key pad 200 may slide out from the phone 100. The first key pad 200 may be a QWERTY key pad. This key pad may be used for composing emails, instant messages, or any other text based communication.

FIG. 3 is a schematic depiction of a mobile electronic device in a second orientation with a second key pad exposed. In this embodiment, a second key pad 300 may slide out from the phone 100. The second key pad 300 may be a numeric key pad similar to those found on many widely available cell phones. The screen 102, in this second orientation, may display in portrait mode.

With continued reference to FIG. 3, although the physical keys 104-110 have rotated relative to the end-user, the functionality of the keys, relative to the end-user, have remained constant. For example, key 1 104 in FIGS. 1 and 2 may have been assigned a "send" functionality. If the phone is rotated clockwise 90 degrees, that "send" key is remapped such that the bottom left soft key, relative to the end-user, retains that functionality. Thus, when the phone 100 is in its second orientation, the "send" function is mapped to key 4 110. The same may be true for the other three keys, such that from the perspective of the end-user, the bottom right key, the top left key and the top right key always perform the same function. In this way, these soft keys 104-110, from the perspective of the end-user, behave as hard keys, constantly performing the same function.

Another aspect of the invention relates to the method for providing virtual hard keys on an electronic device. FIG. 4 is a high level flow chart depicting exemplary steps involved in the implementation of virtual hard keys according to an embodiment of the present invention. The exemplary steps include: detecting the orientation of the device at a first time (Step 400); sensing a change in the orientation of the device to a second orientation (Step 402); mapping a different function to one or more soft keys (Step 404).

The method of the present teachings will be explained with reference to FIGS. 1-4.

At a first time the phone 100 detects its orientation (Step 400). The phone 100 detects its orientation through the use of one or more sensors.

Once the first orientation is detected, for example, upon the user powering up his phone 100, the soft keys 104-110 and the screen 102 are configured accordingly.

When the phone 100, through one or more of its sensors, senses a change in the orientation of the device to a second orientation (Step 402), the phone's processor reconfigures the soft keys such that the functionalities of the soft keys 104-110 remain constant with respect to the end-user (Step 404) and also changes the orientation of the screen 102. If the phone 100 does not sense a change in orientation, then the soft keys 104-110 and the screen 102 will retain their original settings.

In the preferred embodiment, a sensor immediately sends an interrupt signal to the phone's 100 operating system upon detecting a change in orientation. In an alternate embodiment, however, the phone 100 repeatedly polls its sensors to determine whether or not an orientation change has occurred. In this embodiment, the first orientation is stored in the memory of the phone 100. Thus, when a second orientation is detected, the processor can compare the two orientations and determine whether or not to reconfigure the soft keys 104-110. If done through polling, the phone's orientation is preferably checked at a frequency which would appear seamless to an end-user. For example, the phone 100 may poll its sensors once every 100 milliseconds.

Orientation checking may also be triggered by a state change to the phone 100, such as the states change associated with launching a specific application or changing the phone's physical configuration.

Each phone state may have rules for mapping functions to the soft keys 104-110. For example, an application for presenting video to the screen 102 may rotate the screen 102 to ensure that the picture is correctly oriented. In the video player phone state pressing a left key on a keypad relative to the picture orientation rewinds the video feed while a right key advances the video feed. The video presentation application may determine which soft keys 104-110, if any, change their functionality as the phone's 100 orientation changes.

The operation of the device may be more fully understood through the following example.

Karen owns a phone 100 according to the present teachings with two mercury switches, one to detect the first orientation and another to detect a second orientation. Karen wishes to send her friend Michael a text message. Karen extracts her phone 100 from her purse. Karen powers up her phone 100, while the phone 100 is in the second orientation corresponding to FIG. 3. After the phone 100 detects its orientation (Step 400), the screen 102 displays in portrait mode. In this orientation key 4 110 correlates to the "send message" function and key 3 108 correlates to the "compose message" function. In order to access the QWERTY key pad 200, Karen rotates her phone 100 ninety degrees and slides out the key pad 200. The phone 100 senses that its orientation has changed (Step 402). The phone 100 is now in the second orientation. Upon sensing the change in orientation, an interrupt is sent to the processor which shifts the screen 102 to landscape mode and reconfigures the functions of the soft keys (Step 404). For example, to compose a message, Karen will still use the bottom right key. This compose functionality was previously assigned to key 3 108, now it is assigned to key 4 110. Karen presses key 4 110 and composes her message. Once she has finished composing her message, Karen presses the bottom left key, key 1 104, the key now associated with the "send message" function. The message has been sent and Karen returns her phone 100 to her purse.

Variations, modifications, and other implementations of what is described herein will occur to those of ordinary skill in the art without departing from the spirit and scope of the invention as claimed. Accordingly, the invention is to be defined not by the preceding illustrative description but instead by the spirit and scope of the following claims.

What is claimed is:

1. A mobile electronic device comprising:
a sensor for detecting an orientation of the device;
a display screen defining a fixed plane;
a plurality of keys located around a perimeter of the fixed plane; and
a processor programmed to:
perform a first function responsive to a user selection of a first soft key when the device is in a first orientation, the first soft key in a first position relative to the fixed plane,
receive a communication from the sensor indicating a change in the orientation of the device to a second orientation,
responsive to the change in orientation from the first orientation to the second orientation, rotate the fixed plane in a direction and amount opposite the detected change in orientation and assign the first function to a second soft key in the first position relative to the rotated fixed plane, and
perform the first function responsive to a user selection of the second soft key when the device is in the second orientation.

2. The device of claim 1 wherein the sensor comprises a gravimetric sensor.

3. The device of claim 2 wherein the gravimetric sensor comprises a mercury switch.

4. The device of claim 2 wherein the gravimetric sensor comprises a pendulum.

5. The device of claim 2 wherein the gravimetric sensor comprises a ball bearing switch.

6. The device of claim 1 wherein the sensor comprises a gyroscope.

7. The device of claim 1, wherein the processor is further programmed to change the display on the display screen to indicate the change of the first function from the first soft key when the device is in a first orientation to the second soft key when the device is in the second orientation responsive to a detected change in orientation from the first orientation to the second orientation.

8. The device of claim 1, wherein the first soft key and the second soft key are touch screen keys displayed on the display screen.

9. The device of claim 1, wherein the first soft key and the second soft key are located adjacent to the display screen in fixed physical positions such that a change in orientation of the mobile device does not affect the fixed physical positions of the first and second soft keys.

10. A mobile electronic device comprising:
a sensor for detecting an orientation of the device;
a display screen defining a fixed plane;
a plurality of keys located around a perimeter of the fixed plane;
means for performing a first functionality in connection with a first soft key when the device is in the first orientation detected by the sensor, the first soft key in a first position relative to the fixed plane;
means for detecting a change in the orientation of the device from the first orientation to the second orientation;
means for rotating the fixed plane in a direction and amount opposite the detected change in orientation and assigning the first functionality to a second soft key in the first position relative to the rotated fixed plane responsive to the change in the orientation of the device from the first orientation to the second orientation; and means for performing the first functionality in connection with the second soft key when the device is in the second orientation.

11. The device of claim 10 wherein the sensor comprises a gravimetric sensor.

12. The device of claim 10 wherein the sensor comprises a gyroscope.

13. A method for executing a function of a soft key on a device comprising the steps of:
  detecting a first orientation of the device at a first time, the device including a plurality of soft keys located around a perimeter of a fixed plane defined by a display screen of the device;
  performing a first function responsive to a user selection of a first soft key when the device is in the first orientation, the first soft key in a first position relative to the fixed plane;
  sensing a change in the orientation of the device to a second orientation;
  responsive to sensing the change in the orientation from the first orientation to the second orientation, rotating the fixed plane in a direction and amount opposite the detected change in orientation and assigning the first function to a second soft key in the first position relative to the rotated fixed plane; and
  performing the first function responsive to a user selection of the second soft key when the device is in the second orientation.

14. The method of claim 13 further comprising the step of polling sensors in the device to determine the device's orientation after the first orientation is detected.

15. The method of claim 13 further comprising sending an interrupt to a processor within the device immediately after a change in the orientation of the device is sensed.

16. The method of claim 13 wherein the device's orientation is detected using a gravimetric sensor.

17. The method of claim 13 wherein the device's orientation is detected using a gyroscope.

18. The method of claim 13, further comprising:
  responsive to sensing a change in the orientation of the device to a second orientation, changing the display screen to indicate the change of the first function from the first soft key when the device is in a first orientation to the second soft key when the device is in the second orientation.

19. A method for providing soft key functionality for a device, the method comprising:
  associating a functionality to each of a plurality of soft keys, the soft keys located around a perimeter of a fixed plane defined by a display screen of the device, wherein each functionality is associated with a position around the fixed plane;
  responsive to user selections of one or more of the plurality of soft keys, performing the functionalities assigned to the selected soft keys;
  detecting a change in orientation of the device with respect to the fixed plane from a first orientation to a second orientation;
  responsive to the detected change in orientation, rotating the fixed plane in a direction and amount opposite the detected change in orientation and reassigning the functionalities of the soft keys so that the functionality assigned to a soft key located at a particular position relative to the fixed plane when the device is in the first orientation is reassigned to a soft key located at a similar position relative to the rotated fixed plane after the change in orientation from the first orientation to the second orientation; and
  responsive to user selections of one or more of the plurality of soft keys after the reassigning, performing the functionalities reassigned to the selected soft keys.

20. The method of claim 19 wherein the orientation is detected using a gravimetric sensor.

21. The method of claim 19 wherein the orientation is detected using a gyroscope.

22. The method of claim 19, further comprising:
  before detecting the change in the orientation of the device, displaying on the display screen an indication of the functionalities associated with the soft keys; and
  after reassigning the functionalities of the soft keys, displaying on the display screen an indication of the functionalities reassigned to the soft keys.

* * * * *